US006185615B1

(12) United States Patent
Labiaga et al.

(10) Patent No.: US 6,185,615 B1
(45) Date of Patent: Feb. 6, 2001

(54) METHOD AND SYSTEM FOR CONSOLIDATING RELATED PARTIAL OPERATIONS INTO A TRANSACTION LOG

(75) Inventors: Ricardo Labiaga, Sunnyvale, CA (US); Spencer Shepler, Austin, TX (US); Michael D. Kupfer, Mountain View, CA (US)

(73) Assignee: Sun Microsystems, Inc., Palo Alto, CA (US)

( * ) Notice: Under 35 U.S.C. 154(b), the term of this patent shall be extended for 0 days.

(21) Appl. No.: 09/513,404

(22) Filed: Feb. 25, 2000

(51) Int. Cl.[7] .................................................. G06F 13/00
(52) U.S. Cl. .............................................................. 709/224
(58) Field of Search ..................................... 709/201, 202, 709/203, 217, 218, 219, 220, 221, 224, 223

(56) References Cited

U.S. PATENT DOCUMENTS

| 5,648,965 | 7/1997 | Thadani et al. ........................ 370/241 |
| 5,740,355 | 4/1998 | Watanabe et al. ...................... 714/45 |
| 5,787,253 | 7/1998 | McCreery et al. .................... 709/231 |
| 5,842,222 | * 11/1998 | Lin et al. .............................. 707/202 |
| 5,968,134 | * 11/1998 | Putzolu ................................. 709/238 |

OTHER PUBLICATIONS

Callaghan, "WebNFS Server Specification," RFC 2055, http:// src.doc.ic.ac.uk/computing/internet/rfc/rfc2055.txt, pp. 1–10, Oct. 1996.
Callaghan, "WebNFS CLient Specification," RFC 2054, http;//src.doc.ic.ac.uk/computing/internet/rfc/rfc2054.txt, pp.1–15, Oct. 1996.

Sun Microsystems, Inc., "NFS; Network File System Protocol Specification," RFC 1094, http;//src.doc.ic.ac.uk/computing/internet/rfc/rfc1094.txt, pp.1–26, Mar. 1989.

Ricardo Labiaga, "NFS Server Logging," Connectathon '98 Presentation,Sun Microsystems, Inc., Slides 1–13, Mar. 1998.

Callaghan, "NFS URL Scheme," RFC 2224, http;//src.doc.ic.ac.uk/computing/internet/rfc/rfc2224.txt, pp. 1–11, Oct. 1997.

Sun Microsystems, Inc., "Remote Procedure Call Protocol Specification, Version 2," RFC 1057, http;//src.doc.ic.ac.uk/computing/internet/rfc/rfc 1057 .txt, pp. 1–24, Jun. 1988.

callaghan et al., "NFS Version 3 Protocol," RFC 1813, http://src.doc.ic.ac.uk/computing/internet/rfc/rfc 1813.txt, pp. 1–118, Jun. 1995.

* cited by examiner

Primary Examiner—Moustafa M. Meky
(74) Attorney, Agent, or Firm—Beyer Weaver & Thomas, LLP

(57) ABSTRACT

Improved logging techniques that produce transaction logs are disclosed. The logging techniques are able to consolidate multiple related partial operations performed on a server device into a single log entry in a transaction log. Accordingly, the logging techniques are well suited for logging operations of protocols in which transactions are often completed over multiple operations. The logging techniques are particularly well suited for logging access to NFS file and/or directory resources with respect to a NFS server, even when the NFS operations are performed via Remote Procedure Calls (RPCs) to the NFS server.

21 Claims, 12 Drawing Sheets

METHOD AND SYSTEM FOR CONSOLIDATING RELATED PARTIAL OPERATIONS INTO A TRANSACTION LOG

BACKGROUND OF THE INVENTION

1. Field of the Invention

The present invention relates to logs for server resources and, more particularly, to transaction logs for resources of Network File System (NFS) servers.

2. Description of the Related Art

Conventionally, logs have been produced for various different protocols. In recent years, logs for HTTP and FTP protocols have been developed to monitor access to files or web pages. One example is WU-FTPd provided by Washington University of St. Louis, Mo. which logs FTP server activity and produces a logfile. Networking tracing utilities have also been developed to analyze network traffic. Network tracing often involves examination of data packets as well as presentation of traffic or transaction information to network administrators. See, e.g., U.S. Pat. Nos. 5,787,253; 5,648,965; and 5,740,355.

NFS is a protocol for use with file servers. The NFS protocol is defined in protocol specifications RFC 1094 and RFC 1813, which are hereby incorporated by reference. NFS clients can perform file and directory operations on NFS server resources via Remote Procedure Calls (RPCs).

NFS operations performed through RPCs include uploading (writing) or downloading (reading) files from a NFS server. A NFS file is downloaded over a network from a NFS server by first performing a NFS lookup operation to locate the desired object (filehandle of the file or directory). A series of subsequent NFS read operations will normally follow to obtain the actual file data at given offsets in location. The RPC operations may arrive out of order, or the client may request only a subset of the data in the file. A NFS file is uploaded over the network to an NFS server by first performing an NFS lookup operation to locate the corresponding object (filehandle). A series of NFS write operations will typically follow, each of which provides the corresponding offset in the file where the information will be written, as well as the information itself.

Many file related operations have a one to one mapping to NFS protocol operations. For instance, a directory is created by using a single NFS mkdir operation, a file is removed by using a single NFS remove operation, a directory is removed by using a single NFS rmdir operation. However, other file related operations map to multiple NFS operations. For example, as noted above, a file can be download by issuing multiple NFS read operations and a file can be upload by issuing multiple NFS write operations. In either case, when multiple NFS operations are used to perform access operations, the NFS server has no idea of how many reads the download will generate (particularly since the NFS client may choose to generate reads at different offsets out of order) or no idea of how many writes the upload will generate (since the NFS client does not specify the size of the file before it starts writing to the file).

One problem with these conventional logging systems is that they are not suitable for use with the NFS protocol and thus not satisfactory for logging access to NFS servers. Since the NFS protocol does not use an open or close procedure and since the certain operations or transactions are often performed with multiple NFS operations, conventional logging systems do not have any way to know when certain NFS operations (e.g., read and write) have completed. Thus, there is a need for techniques for logging transactions to NFS servers.

SUMMARY OF THE INVENTION

Broadly speaking, the invention relates to improved logging techniques that produce transaction logs. The logging techniques according to the invention are able to consolidate multiple related partial operations performed on a server device into a single log entry in a transaction log. Accordingly, the invention is well suited for logging operations of protocols in which transactions are often completed over multiple operations. The invention is particularly well suited for logging access to NFS file and/or directory resources with respect to a NFS server, even when the NFS operations are performed via Remote Procedure Calls (RPCs) to the NFS server.

The invention can be implemented in numerous ways, including as a method, system, device, and a computer readable medium. Several embodiments of the invention are discussed below.

As a method for consolidating related partial operations performed on a server device into a single log entry in a transaction log, one embodiment of the invention includes at least the acts of: receiving partial operations to be performed on the server device; determining whether the partial operations together form a complete operation; temporarily storing (for purposes of producing the transaction log) only reduced amounts of information about the partial operations; and producing a log entry in the transaction log pertaining to the complete operation based on the temporarily stored information about the partial operations when said determining determines that the partial operations together form the complete operation.

As a method for producing a transaction log for operations performed on a server device, one embodiment of the invention includes at least the acts of: receiving transaction information pertaining to an operation being requested to be performed on the server; determining whether the operation is a complete operation or a partial operation; temporarily storing the transaction information for the operation when the determining operates to determine that the operation is a partial operation; determining whether the partial operation temporarily stored has been completed through subsequent partial operations; and generating a log entry in the transaction log based on the transaction information temporarily stored for the operation after the determining operates to determines that the operation has been completed through subsequent partial operations.

As a transaction logging system for NFS operations directed to a file server, one embodiment of the invention includes at least: a file store that stores a plurality of electronic files; a NFS server coupled to the file store; and a transaction log of NFS activity with respect to the file server. The NFS server includes at least: a NFS server kernel component that receives NFS operation requests and returns replies; a buffer operatively connected to the NFS server kernel component, the buffer stores the NFS operation requests that are received; and a NFS log manager operatively connected to the buffer. The NFS log manager examines the NFS operation requests in the buffer and determines whether the NFS operation requests are complete through a single NFS operation and if not whether the NFS operation requests are complete through multiple NFS operations, and produces a log entry in the transaction log when the NFS log manager determines that the NFS operation requests are complete.

As a computer readable medium including computer program code for consolidating related partial operations performed on a server device into a single log entry in a transaction log, one embodiment of the invention includes at least: computer program code receiving partial operations to be performed on the server device; computer program code determining whether the partial operations together form a complete operation; and computer program code producing a log entry in the transaction log pertaining to the complete operation when the determining determines that the partial operations together form the complete operation.

As a computer readable medium including computer program code for producing a transaction log for operations performed on a server device, one embodiment of the invention includes at least: computer program code for receiving transaction information pertaining to an operation being requested to be performed on the server; computer program code for determining whether the operation is a complete operation or a partial operation; computer program code for temporarily storing the transaction information for the operation when the computer program code for determining determines that the operation is a partial operation; computer program code for determining whether the partial operation temporarily stored has been completed through subsequent partial operations; and computer program code for generating a log entry in the transaction log based on the transaction information temporarily stored for the operation after the computer program code for determining determines that the operation has been completed through subsequent partial operations.

The advantages of the invention are numerous. Different embodiments or implementations may yield one or more of the following advantages. One advantage of the invention is that accurate and intelligent logging of protocols that complete transactions over multiple operations is achieved. Another advantage of the invention is that NFS operations, including those invoked via RPC, can be logged as transactions (e.g., read or write transactions) even when multiple NFS read or write operations (regardless of order) are used to read or write a given file thereby producing a more consolidated and understandable log. Another advantage of the invention is that only minimal amounts of history of the partial operations needs to be maintained while producing the consolidated log of transactions. Still another advantage of the invention is that a transaction log can be produced that resembles that produced by conventional logging systems for protocols (such as FTP or HTTP) where transactions result from single (not multiple) protocol operations.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to improved logging techniques that produce transaction logs. The logging techniques according to the invention are able to consolidate multiple related partial operations performed on a server device into a single log entry in a transaction log. Accordingly, the invention is well suited for logging operations of protocols in which transactions are often completed over multiple operations. The invention is particularly well suited for logging access to NFS file and/or directory resources with respect to a NFS server, even when the NFS operations are performed via Remote Procedure Calls (RPCs) to the NFS server.

Prior to the invention there was no mechanism that would log access to NFS file and directory resources on a NFS server at the level of complete file transfer. Network monitoring tools such as packet sniffers, or programs like tcpdump or snoop, could be used to log individual RPCs, but there existed no utility that would consolidate the various NFS RPC operations performed on a file or directory into simple file access (read, write, create) operations or transactions. Furthermore, network analysis tools such as packet sniffers, or programs like tcpdump or snoop, are decoupled from the NFS service and thus provide no guarantee that they will see all the relevant RPCs for a given transaction. The invention is able to see all the relevant RPCs.

Embodiments of this aspect of the invention are discussed below with reference to FIGS. 1–12B. However, those skilled in the art will readily appreciate that the detailed description given herein with respect to these figures is for explanatory purposes as the invention extends beyond these limited embodiments.

Figure 1:
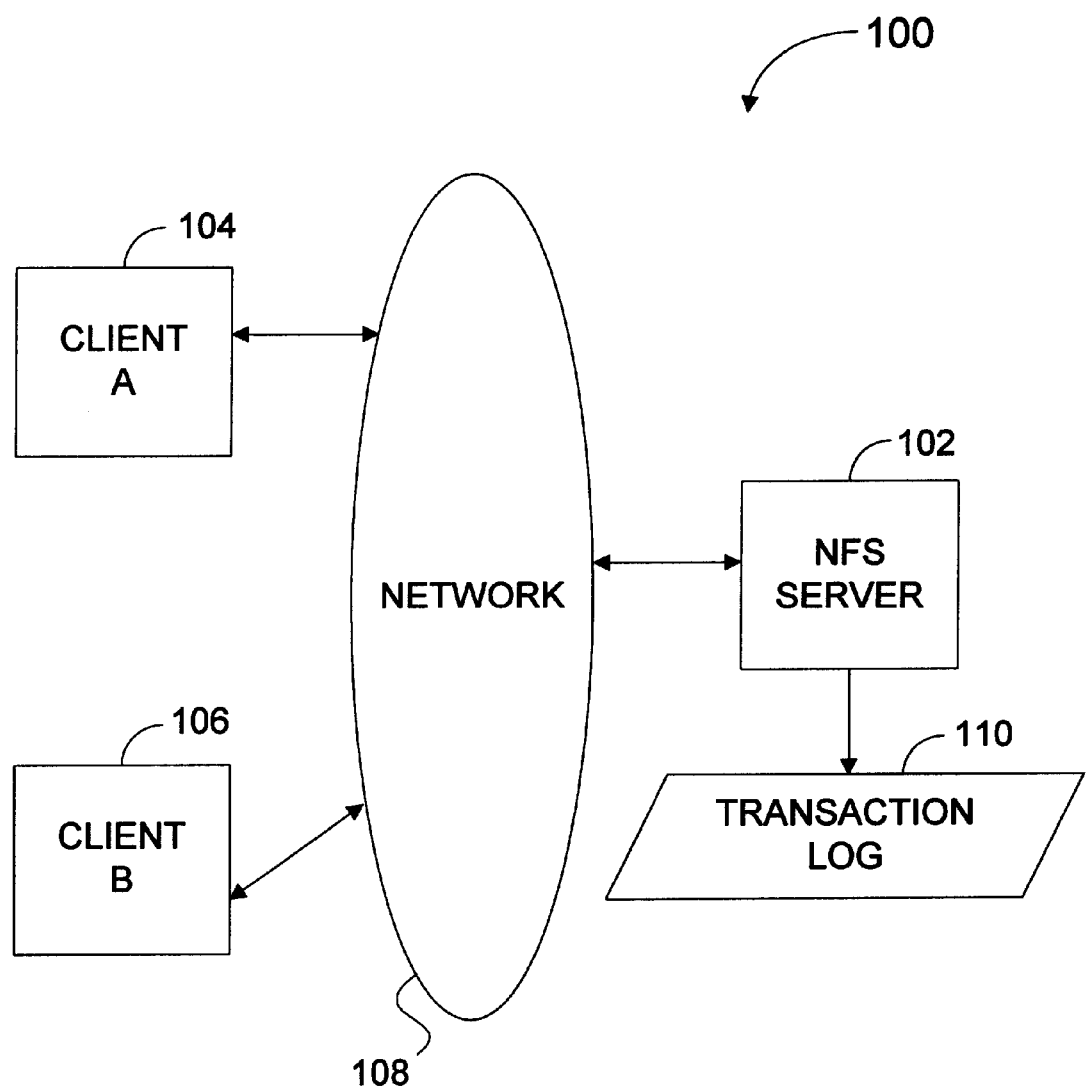
FIG. 1 is a block diagram of a transaction logging system according to one embodiment of the invention.

FIG. 1 is a block diagram of a transaction logging system 100 according to one embodiment of the invention. The transaction logging system 100 includes a NFS server 102. The NFS server 102 is a file server that allows access to local files and directories. Further, the transaction logging system 100 includes a plurality of clients, including client A 104 and client B 106. The clients 104 and 106 issue requests to the NFS server 102 through a network 108. As an example, the clients 104 and 106 are computing devices, and the network 108 can be a public network (e.g., the Internet) or a private network or some combination of both.

More particularly, the clients 104 and 106 perform file and directory operations on the resources of the NFS server 102 via remote procedure calls (RPCs). The NFS server 102 is able to log accesses to the resources of the NFS server 102 as the clients 104 and 106 make RPCs to the NFS server 102. The NFS server 102 produces a transaction log 110 that details the NFS operations being performed by the RPCs. The NFS operations utilize the well-known NFS protocol to access the local directories and files. The NFS server 102 operates to maintain the transaction log 110 of the file and directory operations performed on its associated file system. The NFS server 102 is able to monitor and consolidate multiple NFS RPC operations into single access operations, such as file reads (downloads) and file writes (uploads). This consolidation yields more useful logs of operations or transactions of a NFS server than previously obtained with conventional logging systems. In one implementation, a daemon runs on the NFS server 102. The daemon analyzes the NFS traffic (e.g., access operations) and builds an in-memory table of pending read and write transactions. Each successive RPC on a given object (e.g., filehandle) can either update the state of the pending transaction within the in-memory table, or cause an entry to be written in the transaction log 110, or both.

Figure 2:
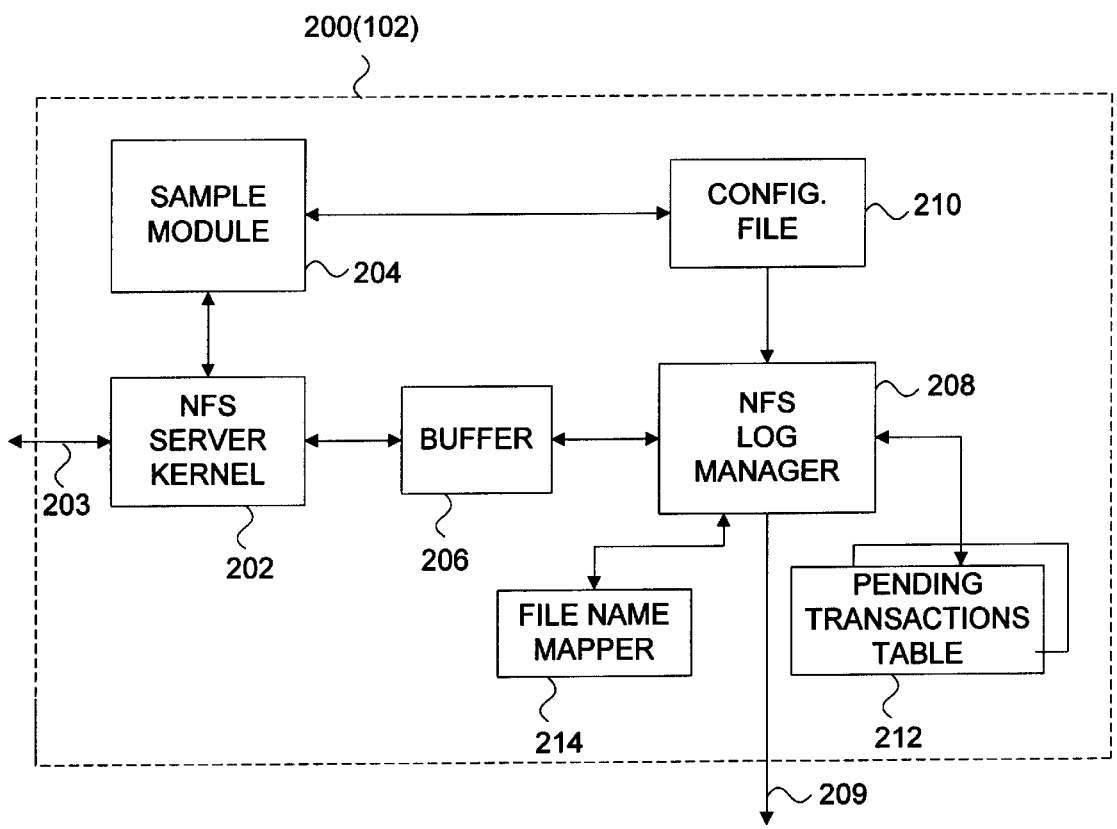
FIG. 2 is a block diagram of a NFS server according to one embodiment of the invention.

FIG. 2 is a block diagram of a NFS server 200 according to one embodiment of the invention. The NFS server 200 is, for example, suitable for use as the NFS server 102 illustrated in FIG. 1.

The NFS server 200 includes a NFS server kernel module (component) 202. The NFS server kernel module 202 interacts with (or is part of) an operating system of a computing device (not shown) that hosts the NFS server 200. The NFS server kernel module 202 receives requests over path 203 for NFS operations as well as returns responses to those requests. The NFS server kernel 202 results in minimal impact on server resources because the replies are sent to the requesting clients before any logging is performed. The logging is, however, done before the arguments of the RPC request and its results are freed. The NFS server 200 also includes a share module 204 which is typically found within NFS servers to enable clients to access files and directories associated with the NFS server via the NFS server kernel module 202.

As incoming NFS requests are received, the NFS operations provided with the requests are stored in a buffer 206. The NFS server 200 can use one or more buffers 206. For example, the NFS server 200 can provide a buffer for each exported file system. Multiple buffers can be used to spread the disk usage across various devices. The NFS server 200 also includes a NFS log manager 208. The NFS log manager 208 is able to process the entries within the one or more buffers 206 to output log entries for the transaction log 110 over a link 209. The NFS log manager 208 is coupled to receive a configuration file 210 which can provide information on the user preferences or default settings associated with the type of logging that the NFS log manager 208 is to perform. The configuration file 210 can also provide the location of various objects or components, such as the buffer 206 (and number of buffers), a file name mapper, and the transaction log 110. In producing the log entries, the NFS log manager 208 is able to utilize one or more pending transactions tables 212 to track those NFS operations that perform a given transaction utilizing a series of NFS operations. With pending transactions, the pending transaction table 212 can store the information pertaining to the read operation such that until the file has been completely read the logging information is provided in the pending transaction table 212. Then, once the file has been completely read, the NFS log manager 208 can read the information for the pending transaction table information 212 and place a log entry in the transaction log 110. The log entry indicates that a read transaction has been performed with respect to a particular file. A file name mapper 214 stores file handle to path mappings which can be built from an analysis of the buffer 206. The file name mapper 214 is used by the NFS log manager 208 to map filehandles stored in the buffer 206 to paths stored in the transaction log 110. In one implementation, the file name mapper 214 is a table.

For example, if a user were to issue a read request to the NFS server 200 in which only the first 10% of a particular file was to be read, and then subsequently reading the remaining 90% of the file over a series of nine additional read request of 10% of the particular file. In this example, the complete read transaction would take 10 NFS read operations to perform. Hence, the NFS log manager 208 can utilize the pending transactions table 212 to store the information pertaining to the individual NFS operations that have been performed until the transaction as whole has been completed. Then, the transaction can be logged into the transaction log 110.

Figure 3A:
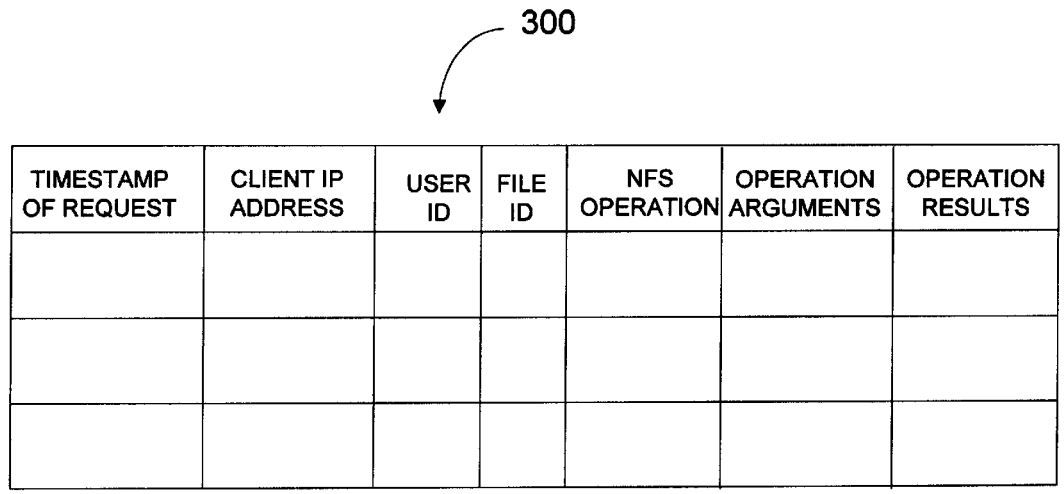
FIG. 3A is an exemplary data structure suitable for use as a buffer (e.g., the buffer illustrated in FIG. 2)

FIG. 3A is an exemplary data structure 300 suitable for use as the buffer 206 illustrated in FIG. 2. The data structure 300 is, for example, a database table that contains various fields which provide information on requests that the NFS server 200 has processed. In one implementation, these various include: time stamp of request, client IP address, user ID, file ID, (NFS) operation, operation arguments, and operation results. Other data structures of formats besides the exemplary data structure 300 can similarly be utilized.

Figure 3B:
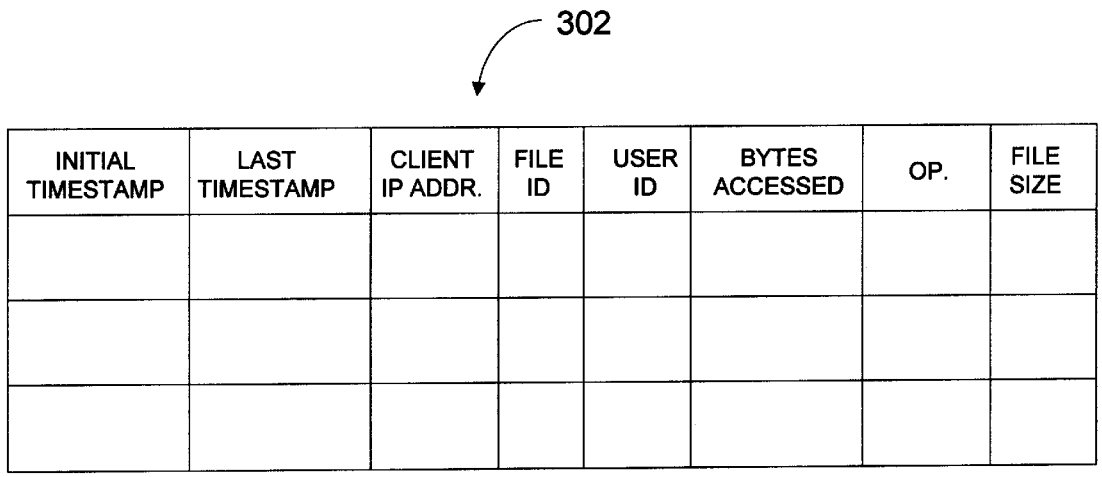
FIG. 3B is an exemplary data structure suitable for use as a pending transactions table (e.g., the pending transactions table illustrated in FIG. 2)

FIG. 3B is an exemplary data structure 302 suitable for use as the pending transactions table 212 illustrated in FIG. 2. The data structure 302 is, for example, a database table that contains various fields which provide information on the NFS operations in progress. In one implementation, the various fields of the pending transactions table 302 include: an initial time stamp, a last time stamp (i.e., time stamp of the most recent RPC), a client IP address, a file ID, a user ID, bytes accessed, operation, and file size. Other data structures of formats besides the exemplary data structure 302 can similarly be utilized.

Figure 4:
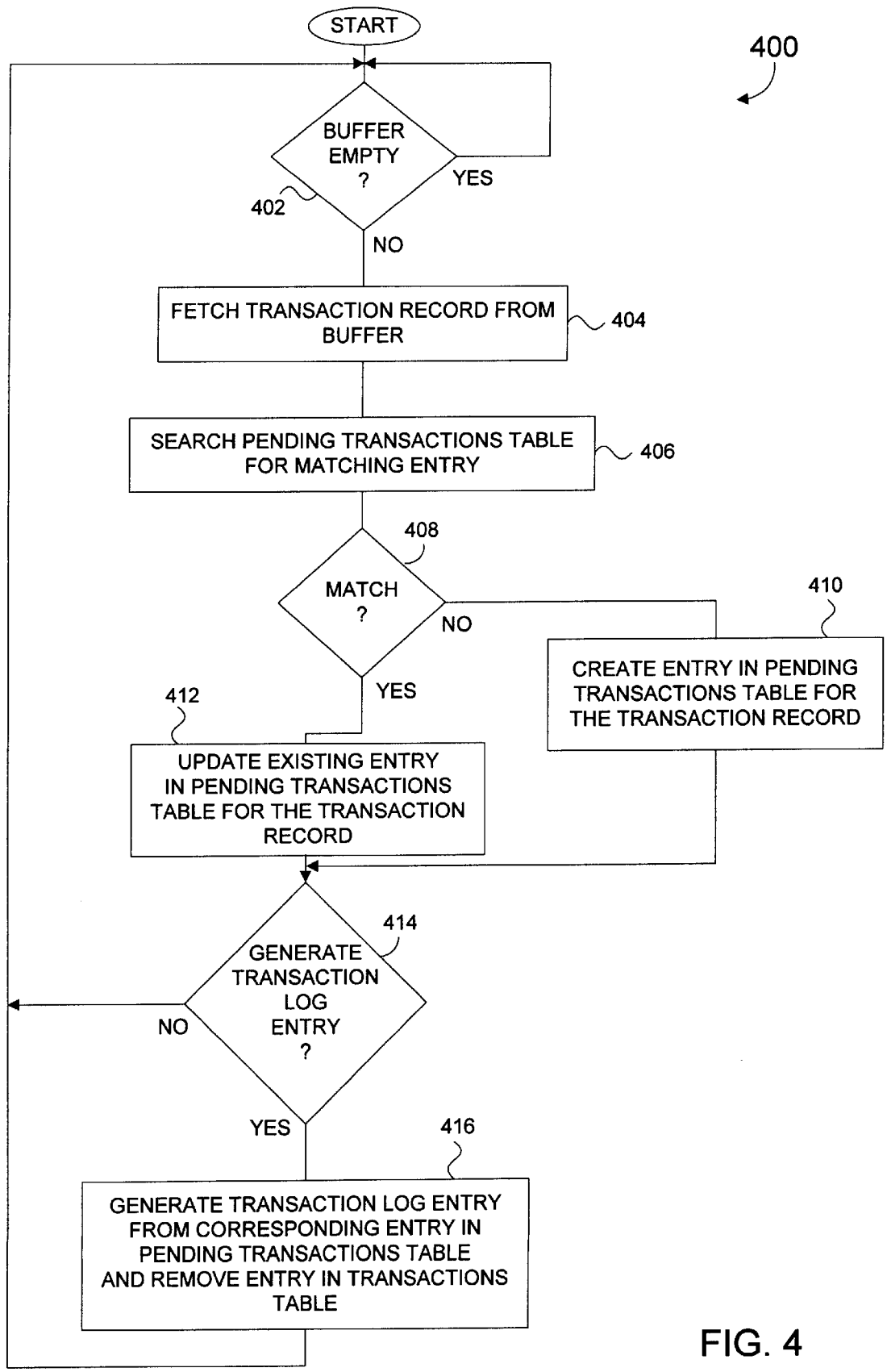
FIG. 4 is a flow diagram of transaction log processing according to one embodiment of the invention.

FIG. 4 is a flow diagram of transaction logging processing 400 according to one embodiment of the invention. The transaction logging processing 400 is, for example, performed by the NFS log manager 208 illustrated in FIG. 2.

The transaction logging processing 400 initially determines whether a buffer holding requested operations is empty. When it is determined 402 that the buffer is empty, then the transaction logging processing 400 waits for the buffer to receive entries (i.e., transaction records for requested operations). Once it is determined 402 that the buffer includes entries, the transaction logging processing 400 continues.

When the transaction logging processing 400 continues, a transaction record (entry) is initially fetched 404 from the buffer. Then, a pending transactions table is searched 406 for a matching entry. Here, the pending transactions table (such as the pending the transactions table 212 illustrated in FIG. 2) is searched for an entry that matches the transaction record that has been fetched 404 from the buffer. In one implementation, the entries in the pending transactions table are deemed to match the fetched transaction record when the corresponding file ID, the operation, the user ID, and the client IP address are the same; however, other implementations could use different criteria. A decision 408 then determines whether a match has been found. When the decision 408 determines that there is no matching entry within the pending transactions table for the fetched transaction record, then an entry is created 410 in the pending transactions table for the transaction record. Here, a new entry is created 410 in the pending transactions table because this fetched transaction record represents the first partial operation of a transaction. On the other hand, when the decision 408 determined that there is a matching entry within the pending transactions table, then the existing entry in the pending transactions table is updated 412 for the fetched transaction record. In this case, there is already an entry in the pending transactions table so, instead of creating a new entry, the existing entry is updated.

Then, following either block 410 or block 412, a decision 414 determines whether a transaction log entry should be generated. When the decision 414 determines that a transactions log entry should not be generated at this time, then the processing returns to repeat the decision 402 and subsequent blocks so that other entries in the buffer can be processed. On the other hand, when the decision 414 determines that a transaction log entry should be generated at this time, then the transaction log entry is generated 416 for the corresponding entry in the pending transactions table. For example, the decision 414 can determine that a transaction log entry should be generated 416 when the corresponding entry in the pending transactions table indicates a transaction has been completed. In one embodiment, the transaction monitored in the pending transactions table is a consolidation of partial transactions, and completion of the transaction is thus performed in increments but considered a single transaction. Following block 416, the processing returns to repeat the block 402 and subsequent blocks so that addition entries within the buffer can be similarly processed.

Figure 5:
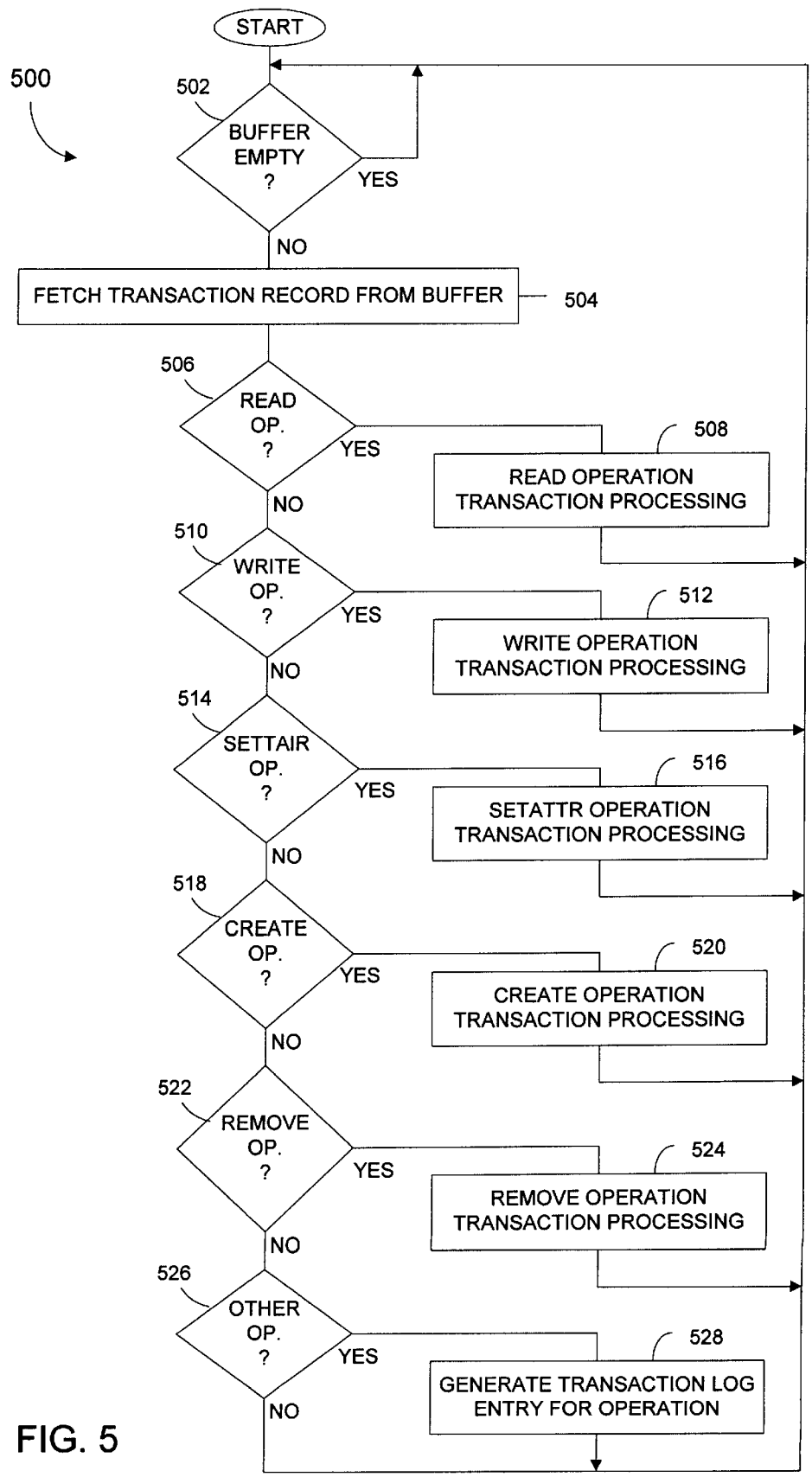
FIG. 5 is a flow diagram of transaction log processing according to another embodiment of the invention.

FIG. 5 is a flow diagram of transaction log processing 500 according to another embodiment of the invention. The transaction logging processing 500 begins with a decision 502 that determines whether the buffer is empty. When the decision 502 determines that the buffer is empty, the transaction log processing 500 waits for entries (transaction records) to be provided within the buffer. Once the decision 502 determines that the buffer is not empty, then a transaction record is fetched 504 for the buffer.

Next, a decision 506 determines whether the operation associated with the transaction record is a read operation. When the decision 506 determines that the operation associated with the transaction record is a read operation, then read operation transaction processing 508 is performed. One embodiment of the read operation transaction processing 508 is detailed below with respect to FIG. 6.

On the other hand, when the decision 506 determines that the operation associated with the transaction record is not a read operation, a decision 510 determines whether the operation is a write operation. When the operation associated with the transaction record is determined to be a write operation, then write operation transaction processing 512 is performed. One embodiment of write operation transaction processing 512 is described in detail below with respect to FIG. 7.

Alternatively, when the decision 510 determines that the operation associated with the transaction record is not a write a operation, then a decision 514 determines whether the operation associated with the transaction record is a set attribute (SETATTR) operation. When the operation associated with the transaction record is determined to be a set attribute operation, then set attribute operation transaction processing 516 is performed. One embodiment of the set attribute operation transaction processing 516 is described in detail below with respect to FIG. 8.

On the other hand, when the decision 514 determines that the operation associated with the transaction record is not the set attribute operation, then a decision 518 determines whether the operation is a create operation. When the decision 518 determines that the operation is a create operation, then create operation transaction processing 520 is performed. One embodiment of the create operation transaction processing 520 is described in detail below with respect to FIG. 9.

Alternatively, when the decision 518 determines that the operation associated with the transaction record is not a create operation, a decision 522 determines whether the operation is a remove operation. When a decision 522 determines that the operation associated with the transaction record is a remove operation, then a remove operation transaction processing 524 is performed. One embodiment of the remove operation transaction processing 524 is described in detail below with respect to FIG. 10.

On the other hand, when the decision 522 determined that the operation associated with the transaction record is not a remove operation, a decision 526 determines whether the operation is some other sort of operation. Normally, each of the transaction records will have an operation that is valid so that the decision 526 would normally be satisfied when the operation is not one of read, write, set attribute, create or remove. In the case of NFS protocol, other operations include make directory (mkdir), make node (mknod), remove directory (rmdir), symbol link (symlink) and link (link). When the decision 526 determines that the operation is one of these other operation types, then a transaction log entry is generated 528 for the operation. These other operation types are those operations that do not need special processing in order to provide meaningful entries in a transaction log. For example, these other operations are normally such that there is no need to consolidate various incremental or partial operations into a single transaction.

Following any of the blocks 508, 512, 516, 520, 524, 526, and 528, the transaction log processing 500 returns to repeat the decision 502 and subsequent blocks so that additional transaction records within the buffer can be processed.

Figure 6:
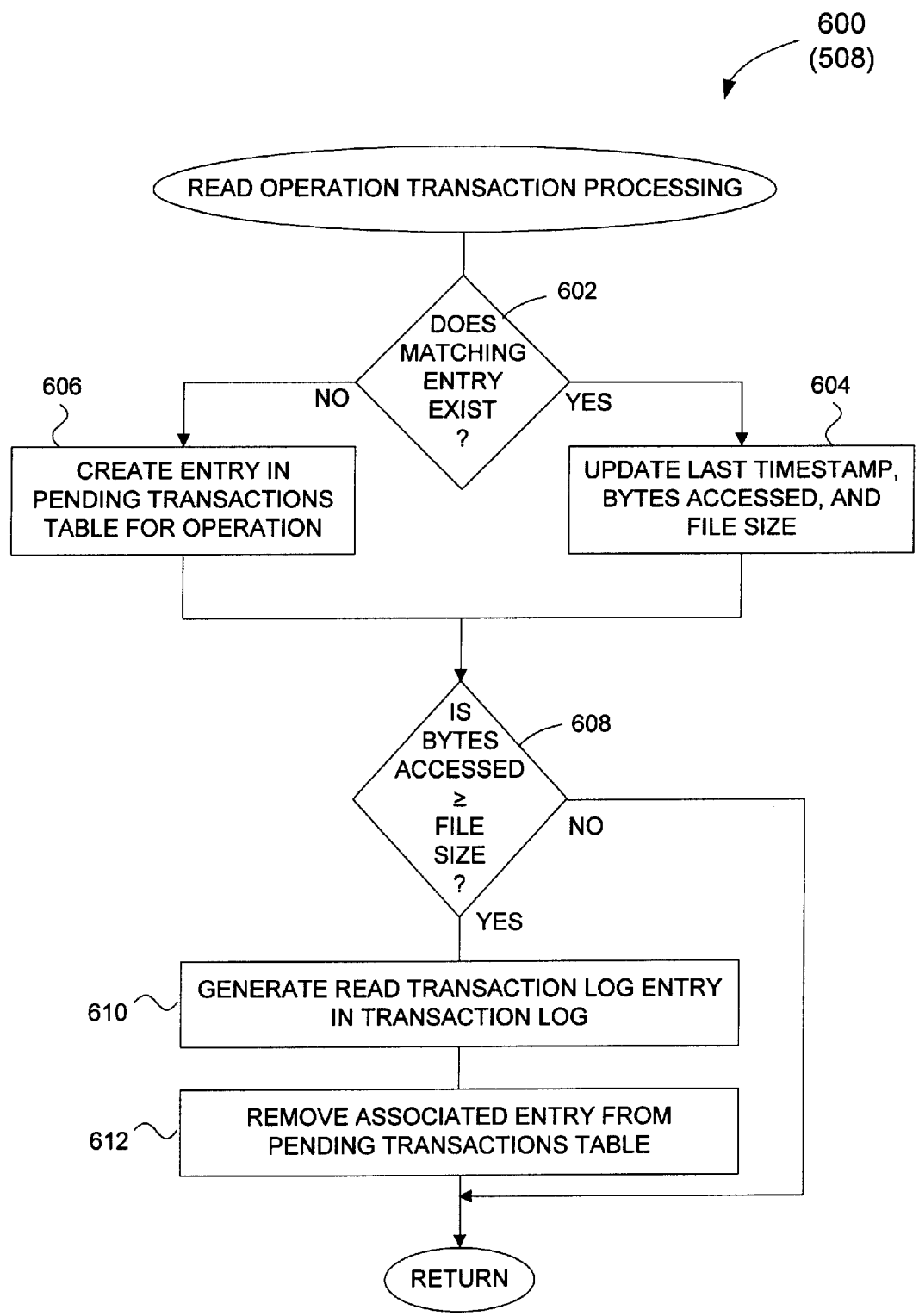
FIG. 6 is the flow diagram of read operation transaction processing according to one embodiment of the invention.

FIG. 6 is the flow diagram of read operation transaction processing 600 according to one embodiment of the invention. As noted above, the read operation transaction processing 600 represents one embodiment of the read operation transaction processing 508 illustrated in FIG. 5.

The read operation transaction processing 600 begins with a decision 602 that determines whether a matching entry exists. Here, the decision 602 determines whether there is an entry within the pending transactions table that corresponds to (i.e., matches) the read operation that is being requested by the transaction record being processed (see, e.g., block 408 of FIG. 4). When a decision 602 determines that a matching entry does exists, the last time stamp, bytes accessed (i.e., bytes read), and file size fields of the matching entry within the pending transactions table are updated 604. On the other hand, when the decision 602 determines that a matching entry does not exists, an entry is created 606 in the pending transactions table for the operation. In one implementation, the entry that is created 606 includes the fields of initial timestamp, last timestamp, client IP address, file ID, user ID, bytes accessed, operation, and file size, such as shown in FIG. 3B.

Following either blocks 604 or 606, a decision 608 then determines whether the bytes accessed (i.e., read) is greater than or equal to the file size. Here, the bytes accessed and file size are provided in different fields of a particular entry within the pending transactions table. When the bytes accessed of this particular entry is compared against the file size of the same entry, the read operation transaction processing 600 is able to determine whether the operation as a whole has been completed. In this case, whether the read operation that was previously initiated has completed (by reading portions of the file in several read operations). When a decision 608 determines that the bytes accessed is greater than or equal to the file size, then a read transaction log entry is generated 610 in the transaction log. Then, the associated entry is removed 612 from the pending transactions table. Alternatively, when the decision 608 determines that the bytes accessed is not greater than or equal to the file size, then the block 610 and 612 are bypassed because the read operation has not yet formed a completed read transaction. Following block 612 or it being bypassed, the read operation transaction processing 600 is complete and returns (to decision 502 in FIG. 5).

Figure 7:
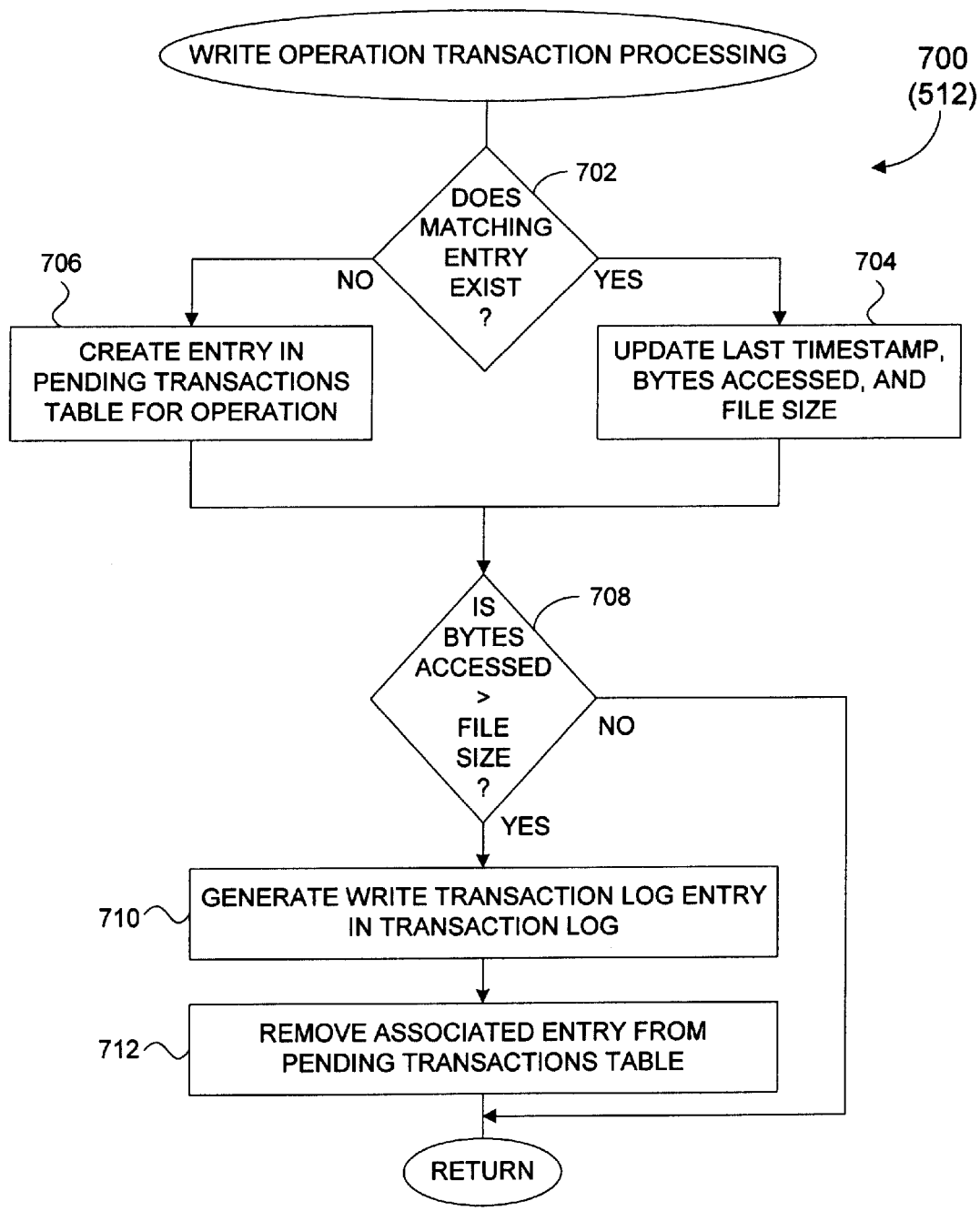
FIG. 7 is a flow diagram of write operation transaction processing according to one embodiment of the invention.

FIG. 7 is a flow diagram of write operation transaction processing 700 according to one embodiment of the invention. As noted above, the write operation transaction processing 700 represents one embodiment of the write operation transaction processing 512 illustrated in FIG. 5.

The write operation transaction processing 700 begins with a decision block 702 that determines whether a matching entry exists. Here, the decision 702 determines whether there is an entry within the pending transactions table that corresponds to (i.e., matches) the write operation that is being requested by the transaction record being processed. When the decision 702 determines that there is a matching entry in the pending transactions table, then the last time stamp, bytes accessed, and file size fields of the matching entry within the pending transactions table are updated 704. On the other hand, when the decision 702 determines that there is no matching entry, then an entry is created 706 in the pending transactions table for the write operation.

Following blocks 704 or 706, a decision 708 determines whether the total number of bytes accessed over the multiple RPC requests (i.e., written) is greater than the file size. Here, the decision 708 determines whether the write operation has been completely performed (i.e., the file having been completely written over several partial write operations). When the decision 708 determines that the bytes accessed is greater than the file size for the corresponding entry within the pending transactions table, then a write transaction log entry is generated 710 in the transaction log. Then, the associated entry is removed 712 from the pending transactions table. Alternatively, when the decision 708 determines that the bytes accessed (i.e., written) is not greater than the file size, then the blocks 710 and 712 are bypassed because the write operation is only partially completed at this time. Following block 712 or its being bypassed, the write operation transaction processing 700 is complete and returns (to decision 502 in FIG. 5).

In one embodiment, the transaction log has a plurality of entries, each entry normally pertaining to a transaction. Each entry, in this embodiment, can include: a time stamp of when the request was processed, duration of the operation, client host name, bytes transferred (accessed), full path of object accessed, operation requested, user ID, service name authentication mechanism. An exemplary read transaction log entry with such a format is as follows: "Wed Dec 2 01:18:02 1998 0 universo 1789/projects/logging/file1 read 19069 nfs 1". However, other formats for transaction log entries can be used.

Figure 8:
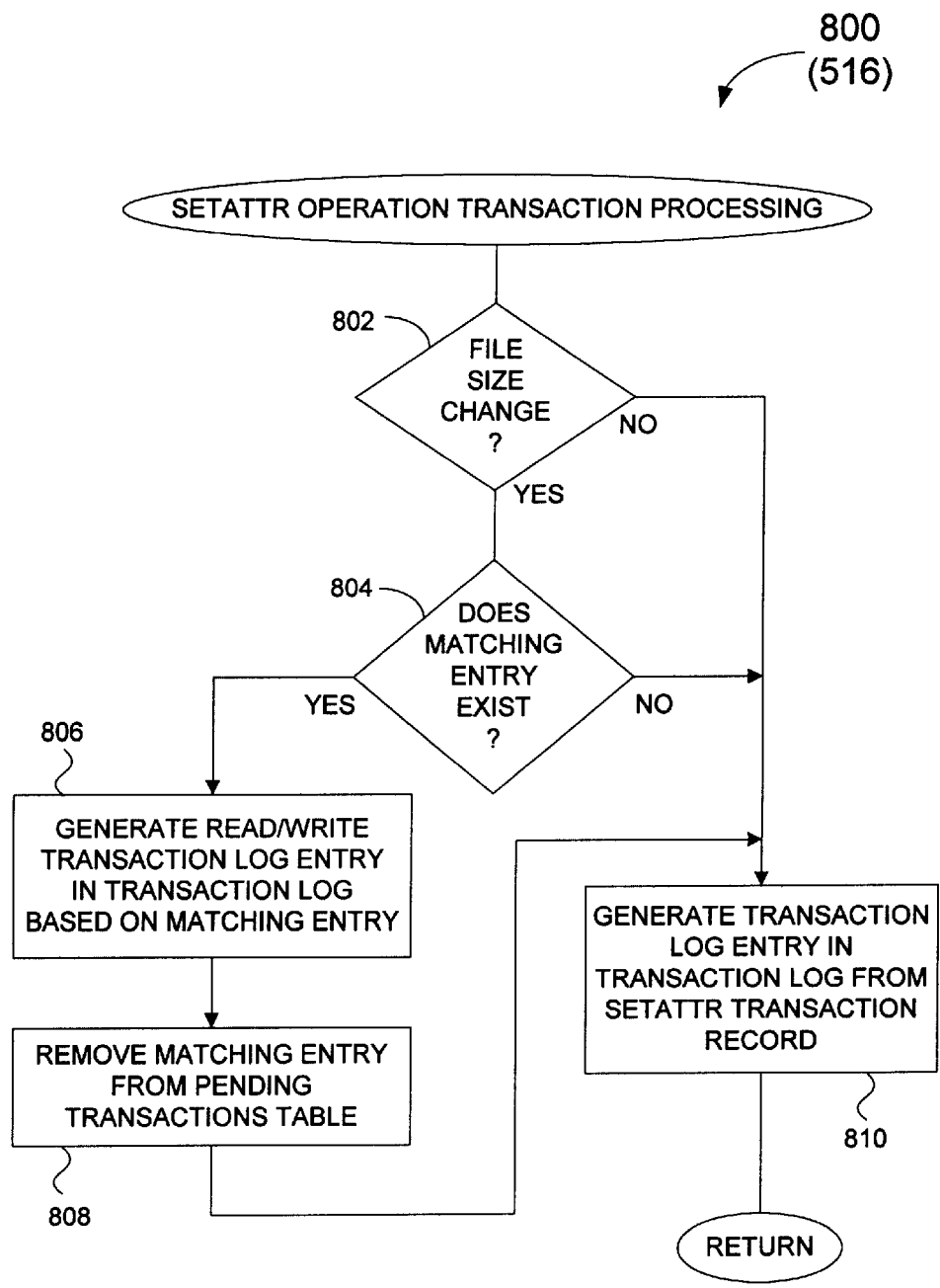
FIG. 8 is a flow diagram of set attribute operation transaction processing according to one embodiment of the invention.

FIG. 8 is a flow diagram of set attribute operation transaction processing 800 according to one embodiment of the invention. As noted above, the set attribute operation transaction processing 800 represents one embodiment of the set attribute operation transaction processing 516 illustrated in FIG. 5.

The set attribute operation transaction processing 800 initially determines 802 whether the file size is being changed. When the decision 802 determines that the file size is being changed, a decision 804 determines whether a matching entry exists. Here, the decision 804 determines whether a matching entry exists in the pending transactions table for the transaction record being processed. When the decision 804 determines that a matching entry (i.e., read or write operation) does exists, then a read or write transaction log entry is generated 806 in the transaction log based on the matching entry. Then, the matching entry is removed 808 from the pending transactions table. Hence, in the case where a set attribute operation operates to change the file size of a file that has been partially read or written, the associated entry in the pending transactions table is deemed effectively completed and a transaction log entry generated. Following block 808 or when the file size is no being changed or when the decision 804 determines that there is no matching entry in the pending transactions table, then a transaction log entry is generated 810 in the transaction log from the set attribute transaction record. Here, the transaction log entry is not a consolidated entry but instead a single, complete entry pertaining to the set attribute operation. Following block 810, the set attribute operation transaction processing 800 is complete and returns (to decision 502 in FIG. 5).

Figure 9:
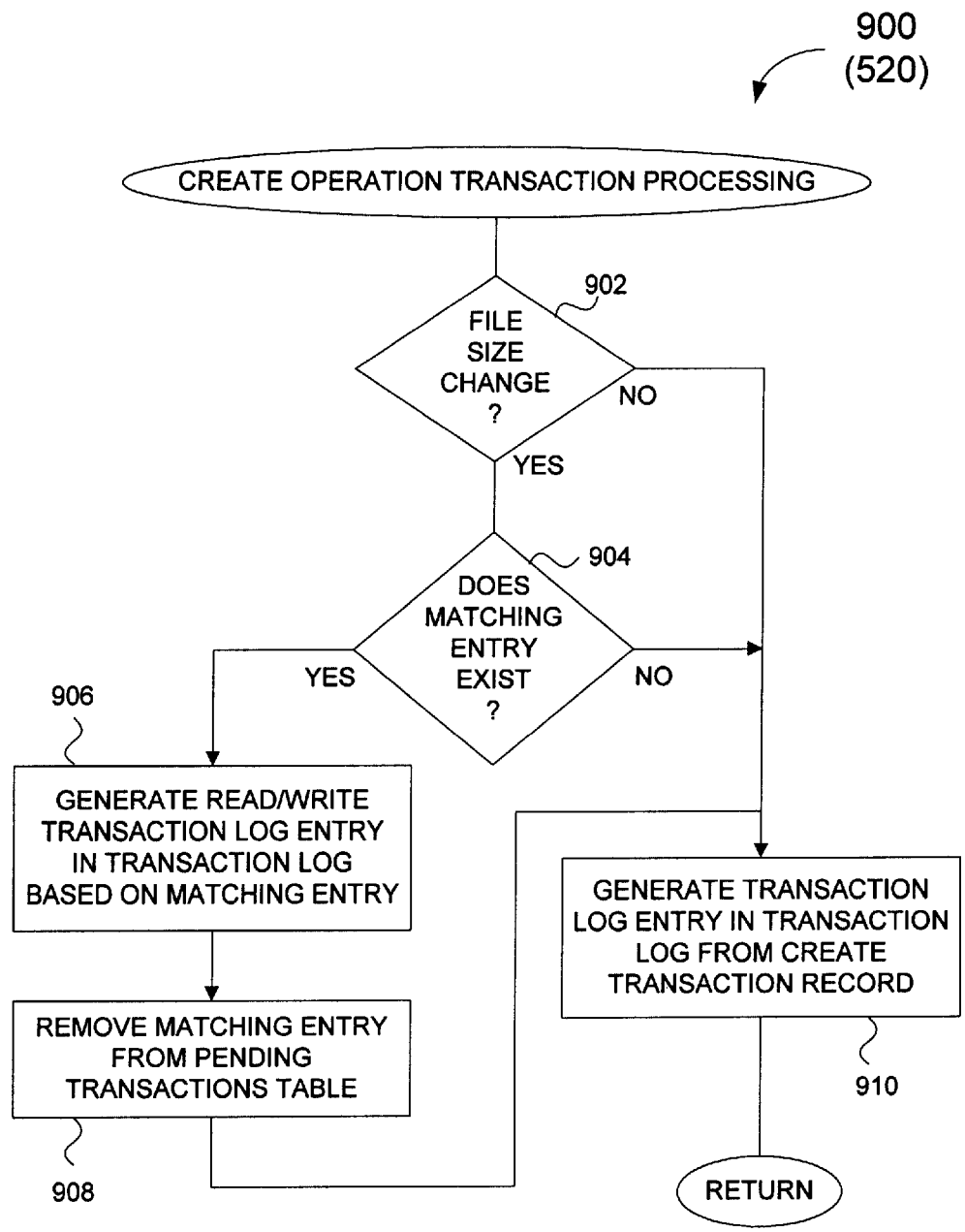
FIG. 9 is a flow diagram of create operation transaction processing according to one embodiment of the invention.

FIG. 9 is a flow diagram of create operation transaction processing 900 according to one embodiment of the invention. As noted above, the create operation transaction processing 900 represents one embodiment of the create operation transaction processing 520 illustrated in FIG. 5.

The create operation transaction processing 900 initially determines 902 whether the file size is being changed. When the decision 902 determines that the file size is being changed, a decision 904 determines whether a matching entry exists. Here, the decision 904 determines whether a matching entry exists in the pending transactions table for the transaction record being processed. When the decision 904 determines that a matching entry (i.e., read or write operation) does exists, then a read or write transaction log entry is generated 906 in the transaction log based on the matching entry. Then, the matching entry is removed 908 from the pending transactions table. Hence, in the case where a create operation operates to change the file size of a file that has been partially read or written, the associated entry in the pending transactions table is deemed effectively completed and a transaction log entry generated. Following block 908 or when the file size is not being changed or when the decision 904 determines that there is no matching entry in the pending transactions table, then a transaction log entry is generated 910 in the transaction log from the create transaction record. Here, the transaction log entry is not a consolidated entry but instead a single, complete entry pertaining to the create operation. Following block 910, the create operation transaction processing 900 is complete and returns (to decision 502 in FIG. 5).

Figure 10:
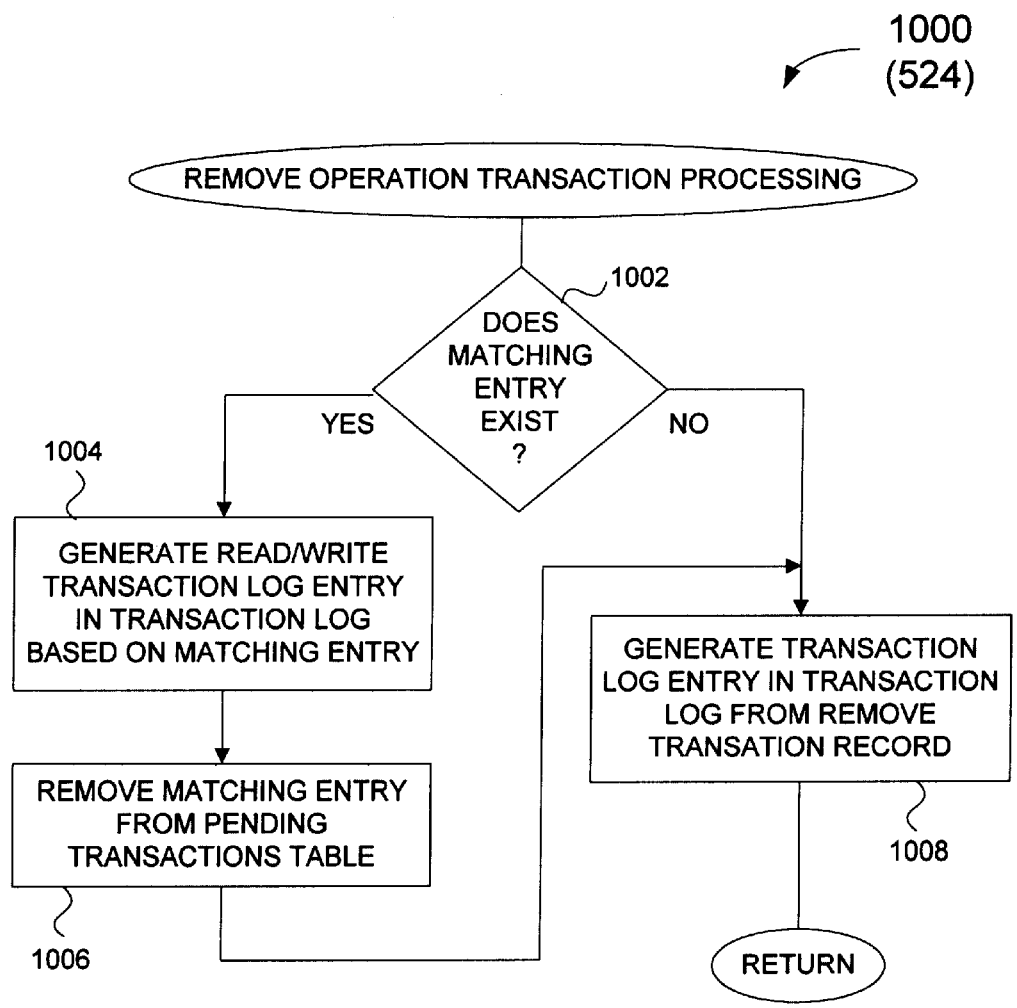
FIG. 10 is a flow diagram of remove operation transaction processing according to one embodiment of the invention.

FIG. 10 is a flow diagram of remove operation transaction processing 1000 according to one embodiment of the invention. As noted above, the remove operation transaction processing 1000 represents one embodiment of the remove operation transaction processing 524 illustrated in FIG. 5.

The remove operation transaction processing 1000 initially determines 1002 whether a matching entry exists. Here, the decision 1004 determines whether a matching entry exists in the pending transactions table for the transaction record being processed. When the decision 1002 determines that a matching entry (i.e., read or write operation) does exists, then a read or write transaction log entry is generated 1004 in the transaction log based on the matching entry. Then, the matching entry is removed 1006 from the pending transactions table. Hence, in the case where a remove operation operates to remove a file that has been partially read or written, the associated entry in the pending transactions table is deemed effectively completed and a transaction log entry generated. Following block 1006 or when the decision 1002 determines that there is no matching entry in the pending transactions table, then a transaction log entry is generated 1008 in the transaction log from the remove transaction record. Here, the transaction log entry is not a consolidated entry but instead a single, complete entry pertaining to the remove operation. Following block 1008, the remove operation transaction processing 1000 is complete and returns (to decision 502 in FIG. 5).

Figure 11:
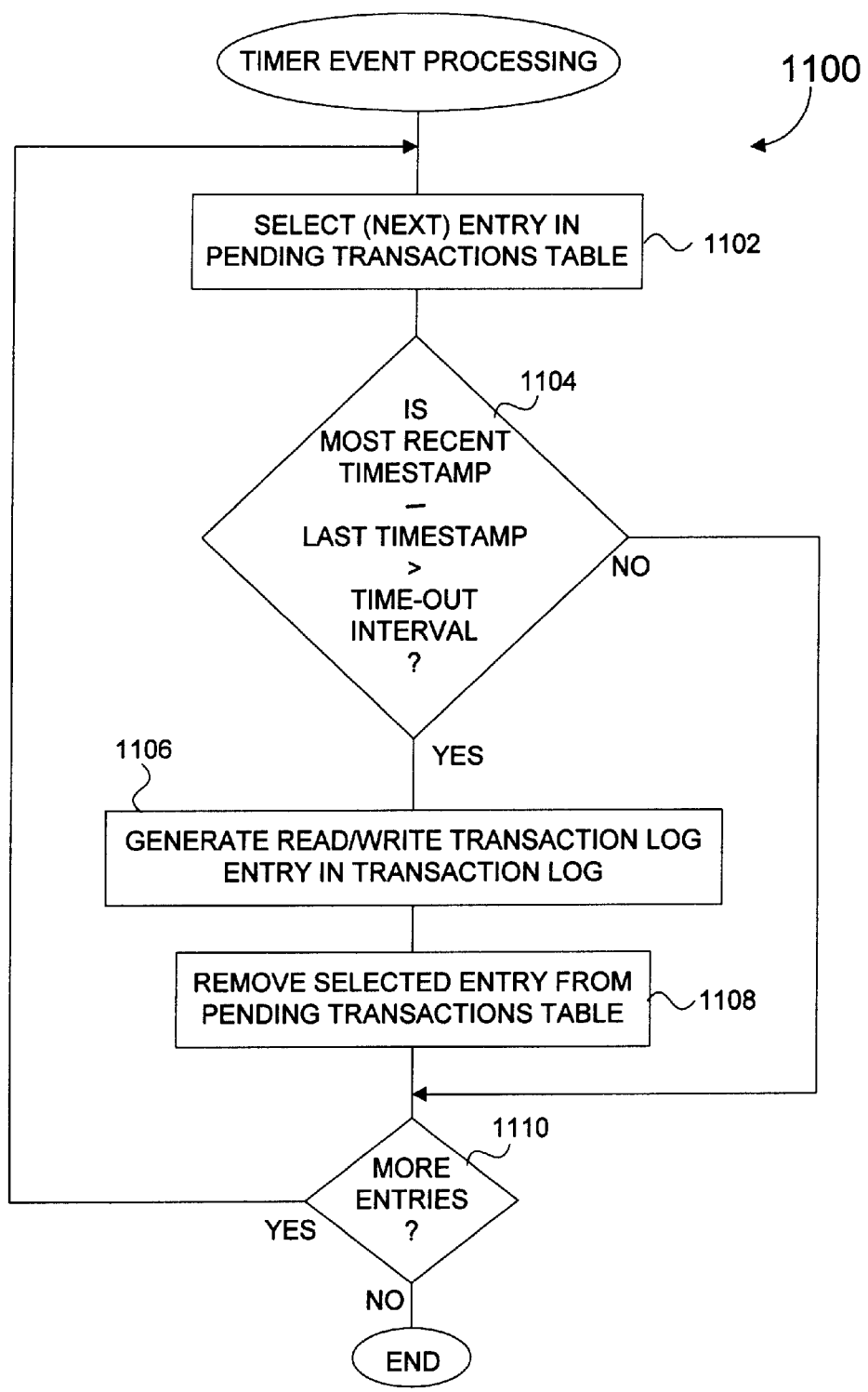
FIG. 11 is a flow diagram of timer event processing according to one embodiment of the invention.

FIG. 11 is a flow diagram of timer event processing 1100 according to one embodiment of the invention. Typically, the timer event processing 1100 is initially triggered or invoked when a periodic timer event is issued. More generally, the timer event processing 1100 is performed periodically by the computing system that services or hosts the NFS server. Once the timer event processing 1100 begins, an entry in the pending transaction table is selected. Then, a decision 1104 determines whether a most recent time stamp minus then last time stamp associated with the entry is greater than the time-out interval. Here, the most recent time stamp represents the most recent time in which the transaction log processing 500 accessed any entry. Although not shown in FIG. 5, the most recent time stamp can be updated each time the transaction log processing 500 is invoked. The time-out interval is a predetermined period of time that represents the duration of time that an entry within the pending transactions table will remain even if there is no further activity associated with the same entry. In other words, the timeout interval can be used to identify stale entries in the pending transactions table. The time-out interval can be, for example, set by parameters within the configuration file 210 or elsewhere. In any case, when the decision 1104 determines that the selected entry is stale, then a read or write transaction log entry in the transaction log is generated 1106. Then, the selected entry is removed 1108 from the pending transactions table. On the other hand, when the decision 1104 determines that the selected entry is not yet determined to be stale, then the blocks 1106 and 1108 are bypassed. Thereafter, a decision 1110 determines whether there are more entries within the pending transactions table to be processed. When the decision 1110 determines that there are more entries to be processed, then timer event processing 1100 returns to repeat the block 1102 and subsequent blocks so that a next entry in the pending transactions table can be selected and thereafter processed. Alternatively, when the decision 1110 determines that there are no more entries within the pending transactions table to be processed, the timer event processing 1100 is complete and ends.

The invention is preferably implemented in software, but can be implemented in hardware or a combination of hardware and software. The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices, carrier waves. The computer readable medium can also be distributed over a network coupled computer systems so that the computer readable code is stored and executed in a distributed fashion.

Figure 12A:
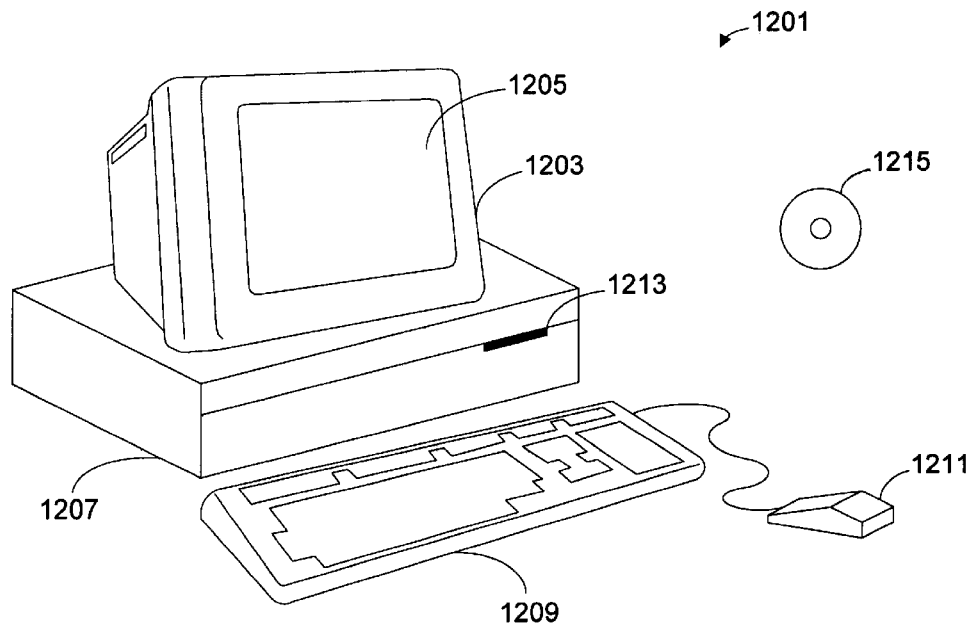
FIGS. 12A and 12B illustrate an example of a computer system that may be used in accordance with the invention to provide consolidation of related operations into a transaction log.
Figure 12B:
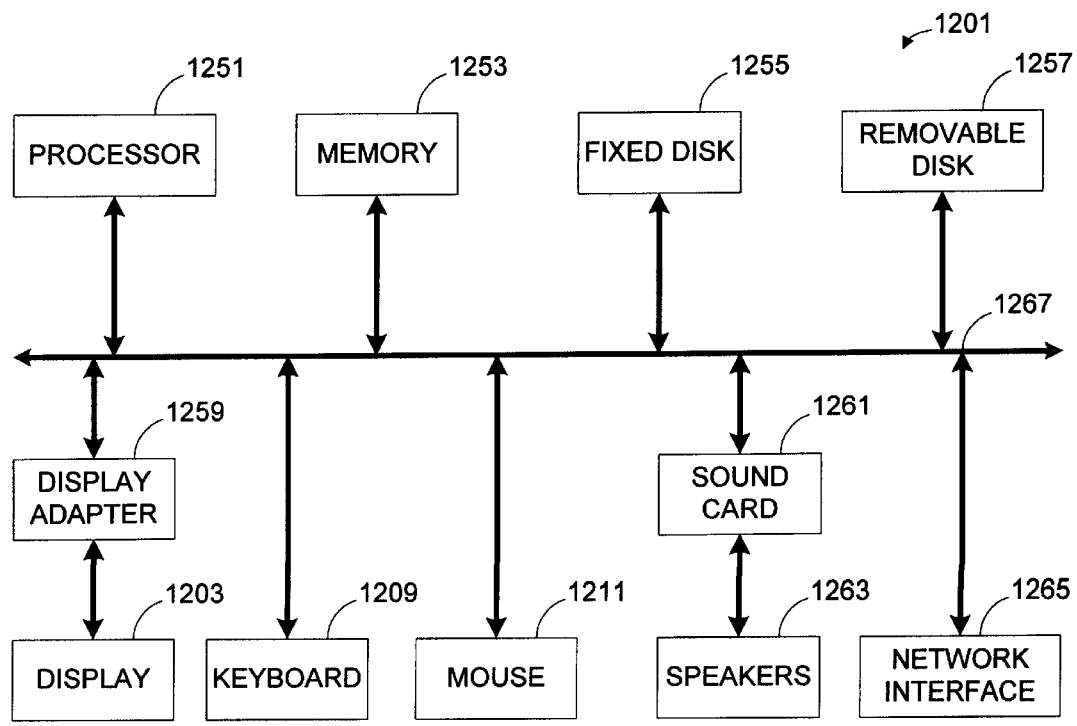

FIGS. 12A and 12B illustrate an example of a computer system that may be used in accordance with the invention to provide transaction log entries by consolidating related partial operations. FIG. 12A shows a computer system 1201 that includes a display 1203, screen 1205, cabinet 1207, keyboard 1209, and mouse 1211. Mouse 1211 may have one or more buttons for interacting with a graphical user interface. Cabinet 1207 houses a CD-ROM drive 1213, system memory and a hard drive (see FIG. 12B) which may be utilized to store and retrieve software programs incorporating computer code that implements the invention, data for use with the invention, and the like. Although CD-ROM 1215 is shown as an exemplary computer readable storage medium, other computer readable storage media including floppy disk, tape, flash memory, system memory, and hard drive may be utilized. Additionally, a data signal embodied in a carrier wave (e.g., in a network including the Internet) may be the computer readable storage medium. In one implementation, an operating system (including the NFS server kernel module) for the computer system 1201 is provided in the system memory, the hard drive, the CD-ROM 1215 or other computer readable storage medium and serves to incorporate the computer code that implements the invention.

FIG. 12B shows a system block diagram of computer system 1201 used to execute the software of an embodiment of the invention. As in FIG. 12A, computer system 1201 includes monitor 1203 and keyboard 1209, and mouse 1211. Computer system 1201 further includes subsystems such as a central processor 1251, system memory 1253, fixed storage 1255 (e.g., hard drive), removable storage 1257 (e.g., CD-ROM drive), display adapter 1259, sound card 1261, speakers 1263, and network interface 1265. The central processor 1251, for example, can execute computer program code (e.g., an operating system) to implement the invention. The operating system is normally, but necessarily) resident in the system memory 1253 during its execution. Other computer systems suitable for use with the invention may include additional or fewer subsystems. For example, another computer system could include more than one processor 1251 (i.e., a multi-processor system) or a cache memory.

The system bus architecture of computer system 1201 is represented by arrows 1267. However, these arrows are illustrative of any interconnection scheme serving to link the subsystems. For example, a local bus could be utilized to connect the central processor to the system memory and display adapter. Computer system 1201 shown in FIG. 12B is but an example of a computer system suitable for use with the invention. Other computer architectures having different configurations of subsystems may also be utilized.

The advantages of the invention are numerous. Different embodiments or implementations may yield one or more of the following advantages. One advantage of the invention is that accurate and intelligent logging of protocols that complete transactions over multiple operations is achieved. Another advantage of the invention is that NFS operations, including those invoked via RPC, can be logged as transactions (e.g., read or write transactions) even when multiple NFS read or write operations (regardless of order) are used to read or write a given file thereby producing a more consolidated and understandable log. Another advantage of the invention is that only minimal amounts of history of the partial operations needs to be maintained while producing the consolidated log of transactions. Still another advantage of the invention is that a transaction log can be produced that resembles that produced by conventional logging systems for protocols (such as FTP or HTTP) where transactions result from single (not multiple) protocol operations.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for consolidating related partial operations performed on a server device into a single log entry in a transaction log, comprising:
   receiving partial operations to be performed on the server device;
   determining whether the partial operations together form a complete operation;
   temporarily storing, for purposes of producing the transaction log, only reduced amounts of information about the partial operations; and
   producing a log entry in the transaction log pertaining to the complete operation based on the temporarily stored information about the partial operations when said determining determines that the partial operations together form the complete operation.

2. A method as recited in claim 1, wherein the partial operations are NFS operations, and the server device is an NFS server device.

3. A method as recited in claim 1, wherein the partial operations pertain to at least read and write operations.

4. A method as recited in claim 1, wherein said determining whether the partial operations together form the complete operation, and
   wherein said method further comprises:
      storing the partial operations in a pending transactions table when said determining determines that the partial operations that have been received do not form the complete operation.

5. A method as recited in claim 4,
   wherein said producing the log entry in the transaction log pertaining to the complete operation is performed in accordance with information stored in the pending transactions table, and
   wherein said method further comprises:
      removing information from the pending transactions table after the log entry in the transaction log is produced.

6. A method as recited in claim 1, wherein the partial operations are requested by a plurality of different clients, and
   wherein said determining whether the partial operations together form the complete operation operates to separately consider those of the partial operations from at least the different clients.

7. A method as recited in claim 6, wherein the server device is a file server and the partial operations pertain to files.

8. A method as recited in claim 1, wherein the partial operations are requested by a plurality of different clients, and
   wherein said determining whether the partial operations together form the complete operation operates to separately consider those of the partial operations from both the different clients and different types of the partial operations.

9. A method as recited in claim 1, wherein the partial operations are requested by a plurality of different clients, and the server device is a file server and the partial operations pertain to files, and
   wherein said determining whether the partial operations together form the complete operation operates to separately consider those of the partial operations that are from a particular one of the different clients, that pertain to a particular one of the files, and that are of a particular type of the partial operations.

10. A method as recited in claim 9, wherein the partial operations pertain to at least read and write operations.

11. A method for producing a transaction log for operations performed on a server device, said method comprising:
   (a) receiving transaction information pertaining to an operation being requested to be performed on the server;
   (b) determining whether the operation is a complete operation or a partial operation;
   (c) temporarily storing the transaction information for the operation when said determining (b) determines that the operation is a partial operation;
   (d) determining whether the partial operation temporarily stored has been completed through subsequent partial operations; and
   (e) generating a log entry in the transaction log based on the transaction information temporarily stored for the operation after said determining (d) determines that the operation has been completed through subsequent partial operations.

12. A method as recited in claim 11, wherein said generating (g) of the log entry in the transaction log is deferred until said determining (d) determines that the operation has been completed through subsequent partial operations.

13. A method as recited in claim 11, wherein said generating (g) of the log entry in the transaction log is further performed when said determining (d) determines that the operation is a complete operation.

14. A method as recited in claim 11, wherein the operation is one of a read and a write operation.

15. A method as recited in claim 11, wherein the partial operations are requested by a plurality of different clients, and
   wherein said determining (d) operates to determines whether the operation has been completed through subsequent partial operations by separately considering those of the partial operations from at least the different clients.

16. A method as recited in claim 15, wherein the server device is a file server and the partial operations pertain to files.

17. A method as recited in claim 11, wherein the partial operations are requested by a plurality of different clients, and
   wherein said determining (d) operates to determine whether the operation has been completed through subsequent partial operations by separately considering those of the partial operations from both the different clients and different types of the partial operations.

18. A method as recited in claim 11, wherein the partial operations are requested by a plurality of different clients, and the server device is a file server and the partial operations pertain to files, and wherein said determining (d) operates to determines whether the operation has been completed through subsequent partial operations by considering those of the partial operations that are from a particular one of the different clients, that pertain to a particular one of the files, and that are of a particular type of the partial operations.

19. A transaction logging system for NFS operations directed to a file server, said system comprising:

a file store that stores a plurality of electronic files;

a transaction log of NFS activity; and a NFS server coupled to said file store, said NFS server includes at least a NFS server kernel module that receives NFS operation requests and returns replies;

a buffer operatively connected to said NFS server kernel module, said buffer stores the NFS operation requests that are received; and a NFS log manager operatively connected to said buffer, said NFS log manager examines the NFS operation requests and determines whether the NFS operation requests are complete through a single NFS operation and if not whether the NFS operation requests are complete through multiple NFS operations, and produces a log entry in said transaction log when said NFS log manager determines that the NFS operation requests are complete.

20. A computer readable medium including computer program code for consolidating related partial operations performed on a server device into a single log entry in a transaction log, said computer readable medium comprising:

computer program code receiving partial operations to be performed on the server device;

computer program code determining whether the partial operations together form a complete operation; and computer program code producing a log entry in the transaction log pertaining to the complete operation when said determining determines that the partial operations together form the complete operation.

21. A computer readable medium including computer program code for producing a transaction log for operations performed on a server device, said computer readable medium comprising:

computer program code for receiving transaction information pertaining to an operation being requested to be performed on the server;

computer program code for determining whether the operation is a complete operation or a partial operation;

computer program code for temporarily storing the transaction information for the operation when said computer program code for determining determines that the operation is a partial operation;

computer program code for determining whether the partial operation temporarily stored has been completed through subsequent partial operations; and computer program code for generating a log entry in the transaction log based on the transaction information temporarily stored for the operation after said computer program code for determining determines that the operation has been completed through subsequent partial operations.

* * * * *